(12) United States Patent
Xu et al.

(10) Patent No.: US 9,534,656 B2
(45) Date of Patent: Jan. 3, 2017

(54) METHOD FOR CONTROLLING STRUCTURAL ACOUSTIC TRANSMISSION ON BASIS OF COMBINED-TYPE VIBRATION ISOLATION DEVICE

(71) Applicants: STATE GRID CORPORATION OF CHINA (SGCC), Beijing (CN); STATE GRID CHONGQING ELECTRIC POWER CO. ELECTRIC POWER RESEARCH INSTITUTE, Chongqing (CN)

(72) Inventors: Luwen Xu, Chongqing (CN); Guojun He, Chongqing (CN); Fangqing Gao, Chongqing (CN); Xiaorui Hu, Chongqing (CN); Anxin Zou, Chongqing (CN)

(73) Assignees: STATE GRID CORPORATION OF CHINA (SGCC), Beijing (CN); STATE GRID CHONGQING ELECTRIC POWER CO. ELECTRIC POWER RESEARCH INSTITUTE, Chongqing (CN)

( * ) Notice: Subject to any disclaimer, the term of this patent is extended or adjusted under 35 U.S.C. 154(b) by 156 days.

(21) Appl. No.: 14/391,073

(22) PCT Filed: Sep. 13, 2013

(86) PCT No.: PCT/CN2013/083472
§ 371 (c)(1),
(2) Date: Oct. 7, 2014

(87) PCT Pub. No.: WO2014/101481
PCT Pub. Date: Jul. 3, 2014

(65) Prior Publication Data
US 2015/0136937 A1    May 21, 2015

(30) Foreign Application Priority Data

Dec. 25, 2012 (CN) .......................... 2012 1 0569290

(51) Int. Cl.
*G10K 11/16* (2006.01)
*F16F 15/02* (2006.01)

(52) U.S. Cl.
CPC ............. *F16F 15/022* (2013.01); *F16F 15/02* (2013.01)

(58) Field of Classification Search
CPC ....................................................... G10K 11/16
(Continued)

(56) References Cited

U.S. PATENT DOCUMENTS

| 6,520,283 | B2 * | 2/2003 | Kemeny | ................. | F16C 23/08 |
| | | | | | 181/207 |
| 6,830,125 | B1 * | 12/2004 | Bizlewicz | ............. | F16F 15/021 |
| | | | | | 181/207 |

(Continued)

FOREIGN PATENT DOCUMENTS

| CN | 201944177 U | 8/2011 |
| CN | 202258736 U | 5/2012 |
| CN | 202301687 U | 7/2012 |
| CN | 202326897 U | 7/2012 |
| CN | 103047336 A | 4/2013 |

OTHER PUBLICATIONS

International Search Report and Written Opinion of the ISA, ISA/CN, mailed Nov. 21, 2013.

*Primary Examiner* — Forrest M Phillips
(74) *Attorney, Agent, or Firm* — Harness, Dickey & Pierce, P.L.C.

(57) ABSTRACT

A method for controlling structure-borne noise based on a combined-type vibration isolation device includes the following steps: S1: determining a combined-type vibration isolation device as required according to parameters of a mechanical device to be isolated, and installing the com- (Continued)

bined-type vibration isolation device on a horizontal bearing surface; S2: vertically placing the mechanical device to be isolated on the combined-type vibration isolation device; S3: adjusting a mass of an intermediate balance weight block of the combined-type vibration isolation device; and S4: adjusting an inherent frequency of the combined-type vibration isolation device to be lower than a structural vibration sound transmission frequency generated in the operation of the mechanical device to be isolated.

8 Claims, 6 Drawing Sheets

(58) Field of Classification Search
USPC .......................................................... 181/207
See application file for complete search history.

(56) References Cited

U.S. PATENT DOCUMENTS

| 7,823,691 | B2* | 11/2010 | Metelski | G02B 21/0012 |
| | | | | 181/207 |
| 2002/0046901 | A1* | 4/2002 | Zapfe | F16F 7/104 |
| | | | | 181/206 |
| 2003/0188921 | A1* | 10/2003 | Kakimoto | E04F 15/225 |
| | | | | 181/285 |
| 2008/0237953 | A1 | 10/2008 | Tanaka et al. | |
| 2009/0242322 | A1* | 10/2009 | Tsai | F16F 15/04 |
| | | | | 181/207 |
| 2012/0111661 | A1* | 5/2012 | Panozzo | B60R 13/02 |
| | | | | 181/207 |

* cited by examiner

METHOD FOR CONTROLLING STRUCTURAL ACOUSTIC TRANSMISSION ON BASIS OF COMBINED-TYPE VIBRATION ISOLATION DEVICE

The present application is the national phase of International Application No. PCT/CN2013/083472, titled "METHOD FOR CONTROLLING STRUCTURAL ACOUSTIC TRANSMISSION ON BASIS OF COMBINED-TYPE VIBRATION ISOLATION DEVICE", filed on Sep. 13, 2013, which claims the benefit of priority to Chinese Patent Application No. 201210569290.2, entitled "METHOD FOR CONTROLLING STRUCTURE-BORNE NOISE BASED ON COMBINED-TYPE VIBRATION ISOLATION DEVICE", filed with the Chinese State Intellectual Property Office on Dec. 25, 2012, both of which applications are incorporated herein in their entireties by this reference.

FIELD

The present application relates to the field of vibration control, in particular to a method for controlling structure-borne noise based on a combined-type vibration isolation device.

BACKGROUND

Noise in a power distribution room mainly includes electromagnetism noise and mechanical noise generated during the operation of a transformer. The electromagnetism noise is generally caused by the magnetostriction of a silicon steel sheet and an electromagnetic force of windings, and the mechanical noise is generated from the device vibration and the running of a cooling fan.

Residential power distribution rooms mostly use dry-type distribution transformers. According to the domestic and foreign research results, noise of the dry-type distribution transformer is mainly caused by the magnetostriction of an iron core. A change cycle of the magnetostriction is exactly a half cycle of the power source frequency (the basic frequency of the power source is 50 Hz in China), therefore the basic frequency of the vibration of the transformer main body caused by the magnetostriction is twice of the power source frequency, and a frequency spectrum of the iron core of the dry-type distribution transformer generally ranges from 100 Hz to 500 Hz.

Generally, a vibration frequency being less than 6 Hz is referred to as a low-frequency vibration, a vibration frequency ranging from 6 Hz to 100 Hz is referred to as an intermediate-frequency vibration, and a vibration frequency being greater than 100 Hz is referred to as a high-frequency vibration. Generally, the vibration of the transformer is transmitted out at a frequency of 100 Hz or frequency multiplication of 100 Hz, which all belong to the high-frequency vibration.

At present, there are two technical measures for controlling structure-borne noise in an indoor transformer station or the power distribution room.

(1) A first measure is a sound absorption and isolation measure. On one hand, such measure has a good effect for controlling air-borne noise, however, the effect for controlling structure-borne noise is generally poor, and the frequency range of the noise to be absorbed and isolated is limited due to conventional sound absorbing and isolating materials. On the other hand, when the conventional measure of sound absorption and isolation is employed in the indoor transformer station or the power distribution room, the performance of ventilation and heat exchanging may be reduced, and the temperature of the running transformer may be increased, which may accelerate the aging of insulating materials of the transformer, and adversely affect the service time of the transformer.

(2) A second measure is to provide a simple vibration isolation system. At present, for controlling the structure-borne noise of the transformer, some construction units employ the simple vibration isolation system, which includes several damping springs, several shock pads, or a combination of the damping springs and the shock pads, however, since the simple vibration isolation system is not reasonably optimized during the assembling and adjusting process, the effect for controlling the high-frequency vibration generated by the transformer is not desirable.

The best manner for restraining the structure-borne noise from being transmitted out is to use a vibration isolation seat. In the classic vibration isolation theory, it is believed that the vibration isolation has a better effect for controlling the high-frequency vibration, however the efficiency for controlling the low-frequency vibration is low, and the difficulty of vibration isolation lies in the low-frequency range. In recent years, with the continuous development of the technology for designing and manufacturing the vibration isolation seat, the natural frequency of the vibration isolation seat may be lower. At present, in China, the natural frequency of the vibration isolation seat under the rated load is already as low as 3 Hz to 5 Hz, which solves the problem that the effect of the vibration isolation in the low-frequency range is poor, however, a problem of the vibration isolation in the high-frequency range is highlighted. According to a large amount of researches, the conventional simple vibration isolation device only has a good effect in the low-frequency range, and has an undesirable vibration isolation effect in controlling the vibration interferences in a high-frequency range which is above 100 Hz.

Thus, it is urgent to provide a method for effectively controlling the high-frequency structure-borne noise generated by a vibration device. The method may be adapted to the field of structure-borne noise transmission control and vibration control for vibration devices, such as transformers, electric reactors, or capacitors in the transformer stations and the power distribution rooms.

SUMMARY

In view of this, a technical issue to be addressed is to provide a method for controlling structure-borne noise based on combined-type vibration isolation device, to efficiently control high-frequency structure-borne noise generated by a vibration device. The method may be adapted to the field of structure-borne noise transmission control and vibration control for vibration devices, such as transformers, electric reactors, or capacitors in the transformer stations and the power distribution rooms.

A method for controlling structure-borne noise based on combined-type vibration isolation device according to the present application may include the following steps:

S1: determining a combined-type vibration isolation device as required according to parameters of a mechanical device to be isolated, and installing the combined-type vibration isolation device on a horizontal bearing surface;

S2: vertically placing the mechanical device to be isolated on the combined-type vibration isolation device;

S3: adjusting a mass of an intermediate balance weight block of the combined-type vibration isolation device; and S4: adjusting an inherent frequency of the combined-type vibration isolation device to be lower than a structural vibration sound transmission frequency generated in the operation of the mechanical device to be isolated.

Preferably, the installing the combined-type vibration isolation device on a horizontal bearing surface in the step S1 may include the following steps:

S11: installing a bottom-layer rubber and a base plate on the horizontal bearing surface;

S12: installing a rubber vibration isolator on the base plate;

S13: installing an intermediate mass block on the rubber vibration isolator;

S14: installing a spring vibration isolator and a damper on the intermediate mass block;

S15: installing a supporting plate and a top-layer rubber on the spring vibration isolator and the damper; and S16: installing the mechanical device to be isolated on the top-layer rubber.

Preferably, the vertically placing the mechanical device to be isolated on the combined-type vibration isolation device in the step S2 is performed in a manner that a center of gravity of the mechanical device to be isolated coincides with a center of gravity of the combined-type vibration isolation device.

Preferably, the determining a combined-type vibration isolation device as required according to parameters of a mechanical device to be isolated in the step S1 may include the following steps:

S17: determining a size of a base plate of the combined-type vibration isolation device based on a size of a bottom of the mechanical device to be isolated; and S18: determining a mass and a distribution manner of an intermediate mass block of the combined-type vibration isolation device based on a mass of the mechanical device to be isolated.

Preferably, the step S4 may further include the followings steps:

S41: adjusting a rigidity parameter and a damping parameter of each of a spring vibration isolator, a damper and a rubber vibration isolator of the combined-type vibration isolation device; and S42: determining a number of the spring vibration isolator and a number of the rubber vibration isolator of the combined-type vibration isolation device.

Preferably, the mechanical device to be isolated is connected to a bridge frame, a cable and a pipeline in flexible connection.

Preferably, an installing position of the rubber vibration isolator is opposite to an installing position of the spring vibration isolator in a vertical direction.

Preferably, the spring vibration isolator is installed above the intermediate mass block and the rubber vibration isolator is installed below the intermediate mass block.

Preferably, the intermediate mass block is installed between the spring vibration isolator and the rubber vibration isolator, and the spring vibration isolator and the rubber vibration isolator are uniformly distributed around the intermediate mass block.

Compared with the conventional technology, the present application has the following advantages.

The combined-type vibration isolation system is used to control the transmission of high-frequency structure-borne noise. A vibration isolation device is provided between the mechanical device to be isolated and a bearing base, and the vibration isolation device is a combined-type vibration isolation device and has a better vibration isolation effect in the high-frequency range compared to the simple vibration isolation system. By adjusting the mass of the intermediate balance weight block, the inherent frequency of the combined-type vibration isolation device may be adjusted to be lower than the structural vibration sound transmission frequency generated during the operation of the mechanical device to be isolated, thereby reducing the energy transmission of the structure-borne noise of the mechanical device to be isolated and efficiently isolating the structure-borne noise generated by the vibration of the mechanical device.

BRIEF DESCRIPTION OF THE DRAWINGS

For more clearly illustrating embodiments of the present application or the technical solution in the conventional technology, drawings referred to describe the embodiments or the conventional technology is briefly described hereinafter. Apparently, the drawings in the following description are only a few of embodiments of the present application, and for those skilled in the art other drawings may be obtained based on these drawings without any creative efforts.

DETAILED DESCRIPTION OF THE EMBODIMENTS

The technical solutions in the embodiments of the present application are described clearly and completely hereinafter in conjunction with the drawings in the embodiments of the present application. Apparently, the described embodiments are only a few of but not all embodiments of the present application. Based on the embodiments in the present application, all of other embodiments, made by the person skilled in the art without any creative efforts, fall into the scope of the present application.

For making the objects, features and advantages of the present application more clear and understandable, embodiments of the present application are described in detail in conjunction with drawings.

Figure 1:
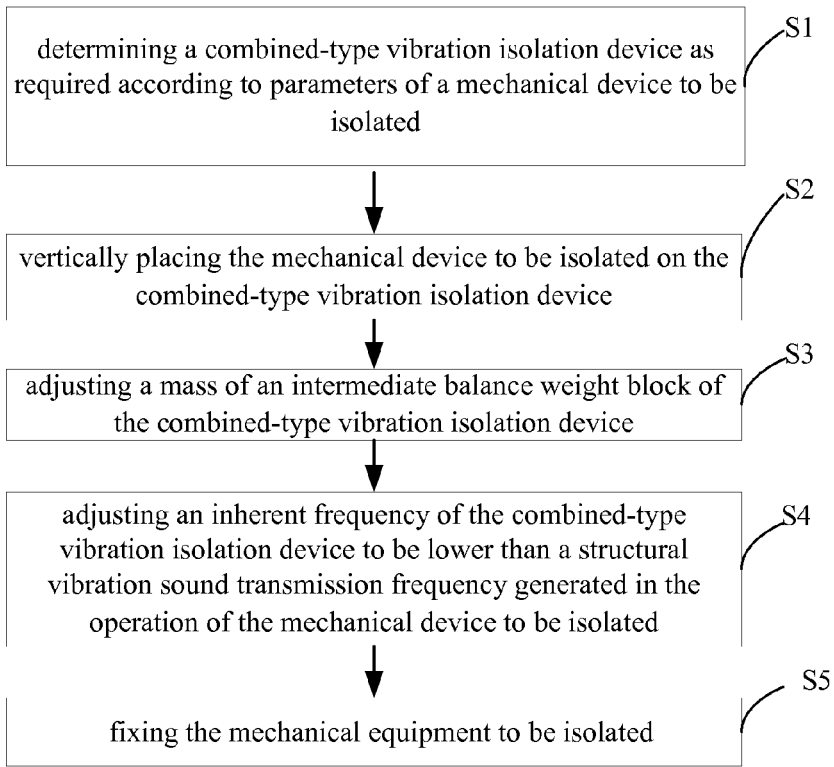
FIG. 1 is a flow chart of a preferred embodiment of the present application.

Reference is made to FIG. 1, which is a flow chart of a first embodiment of a method for controlling structure-borne noise based on combined-type vibration isolation device according to the present application.

A method for controlling structure-borne noise based on combined-type vibration isolation device according to this embodiment may include the following steps.

Step S1 may include determining a combined-type vibration isolation device as required according to parameters of a mechanical device to be isolated, and installing the combined-type vibration isolation device on a horizontal bearing surface.

Step S2 may include vertically placing the mechanical device to be isolated on the combined-type vibration isolation device.

Step S3 may include adjusting a mass of an intermediate balance weight block of the combined-type vibration isolation device.

Step S4 may include adjusting an inherent frequency of the combined-type vibration isolation device to be lower than a structural vibration sound transmission frequency generated in the operation of the mechanical device to be isolated.

It should be noted that, the inherent frequency of the combined-type vibration isolation device may be adjusted to be an optimal frequency point or in a range around the optimal frequency point, and in this case, the vibration isolation effect is optimal. However, the inherent frequency must be lower than the structural vibration sound transmission frequency generated in the operation of the mechanical device to be isolated.

The optimal frequency point (or range) may be calculated based on relevant operation vibration parameters of the mechanical device to be isolated according to the structure-borne noise isolation theory.

Step S5 may include fixing the mechanical device to be isolated.

It should be noted that, the mechanical device to be isolated in this embodiment may be any one of a transformer, an electric reactor or a capacitor in the transformer station or the power distribution room. A reinforced concrete mass block with sufficient rigidity is installed at a bottom of the transformer to improve the rigidity of a machine seat and reduce an amplitude of the device, thus the balance performance and the uniformity of mass distribution of the machine unit may be improved, the vibration isolator may be stressed uniformly, and the frequency characteristic of the whole structure may be optimized, which may facilitate restraining high-frequency noise, improve force environment of the vibration isolation device and prolong the service life thereof.

In this embodiment of the present application, the combined-type vibration isolation system is used to control the transmission of high-frequency structure-borne noise. A vibration isolation device is provided between the mechanical device to be isolated and a bearing base, and the vibration isolation device is a combined-type vibration isolation device and has a better vibration isolation effect in the high-frequency range compared to the simple vibration isolation system. By adjusting the mass of the intermediate balance weight block, the inherent frequency of the combined-type vibration isolation device may be adjusted to be lower than the structural vibration sound transmission frequency generated during the operation of the mechanical device to be isolated, thereby reducing the energy transmission of the structure-borne noise of the mechanical device to be isolated and efficiently isolating the structure-borne noise generated by the vibration of the mechanical device.

For those skilled in the art to better understand and implement technical solutions of the present application, the specific structure of the combined-type vibration isolation device according to the present application is described in conjunction with FIG. 2 hereinafter.

The combined-type vibration isolation device according to an embodiment of the present application is described in detail hereinafter in conjunction with FIG. 2.

Figure 2:
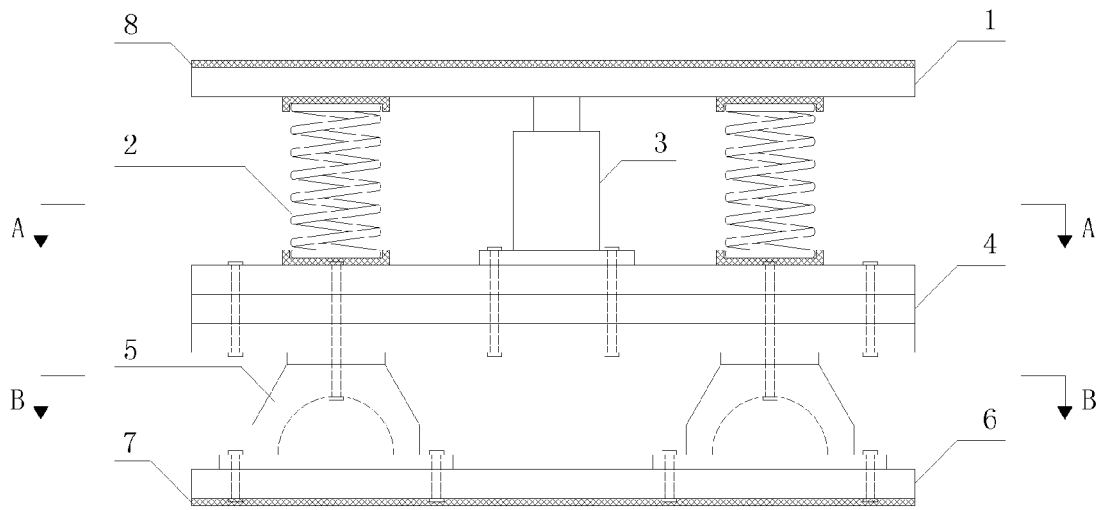
FIG. 2 is a schematic view of a combined-type vibration isolation device according to a preferred embodiment of the present application.

Reference is made to FIG. 2, which is a schematic view of a combined-type vibration isolation device according to a preferred embodiment of the present application.

It should be noted that, the combined-type vibration isolation device according to the embodiment of the present application is a double-layer vibration isolation and noise reduction device.

The combined-type vibration isolation device includes a top-layer rubber 8, a supporting plate 1, a spring vibration isolator 2, a damper 3, an intermediate mass block 4, a rubber vibration isolator 5, a base plate 6, and a bottom-layer rubber 7.

As shown in FIG. 2, the rubber vibration isolator 5 is installed on the base plate 6.

It should be noted that, two spring vibration isolators 2 and two rubber vibration isolators 5 are provided in the vibration isolation device according to this embodiment, and are both arranged to be bilaterally symmetrical.

The intermediate mass block 4 is installed on the rubber vibration isolator 5.

It should be noted that, the intermediate mass block 4 according to the embodiment of the present application may employ a steel plate or a concrete plate as a basic body to ensure the basic mass of the balance weight block of the intermediate mass block 4, and the intermediate mass block 4 is further provided with a proper number of balance weight sub-blocks with different mass grades, thus the whole mass of the intermediate mass block 4 may adapt to vibration isolation requirements for different mechanical devices. The whole mass of the intermediate mass block may be changed by increasing or decreasing the number of the balance weight sub-blocks.

It should be noted that, the balance weight sub-blocks may have the same weight or different weights.

It can be understood that, the basic body and the balance weight sub-blocks should be fixedly connected, and the specific connection manner may be a bolt connection, a snap-fit connection or a cementing.

The spring vibration isolators 2 and the damper 3 are installed on the intermediate mass block 4.

It should be noted that, the damper 3 is installed at a center of the intermediate mass block 4 and the two spring vibration isolators 2 are symmetrically installed at two sides of the damper 3.

The supporting plate 1 is installed on the spring vibration isolators 2 and the damper 3.

The top-layer rubber 8 is provided on an upper end of the supporting plate 1 and the bottom-layer rubber 7 is provided on a lower end of the base plate 6.

Referring to FIG. 2, the installing the combined-type vibration isolation device on a horizontal bearing surface in step S1 in FIG. 1 may include the following steps.

Step S11 may include installing a bottom-layer rubber 7 and a base plate 6 on the horizontal bearing surface.

Step S12 may include installing a rubber vibration isolator 5 on the base plate 6.

Step S13 may include installing an intermediate mass block 4 on the rubber vibration isolator 5.

Step S14 may include installing a spring vibration isolator 2 and a damper 3 on the intermediate mass block 4.

Step S15 may include installing a supporting plate 1 and a top-layer rubber 8 on the spring vibration isolator 2 and the damper 3.

It should be noted that, after the combined-type vibration isolation device is installed on the horizontal bearing surface, the mechanical device to be isolated is installed on the top-layer rubber 8.

In the step S2, an assembling is performed in a manner that a center of gravity of the mechanical device to be isolated coincides with a center of gravity of the combined-type vibration isolation device.

The installing position of the rubber vibration isolator 5 is opposite to the installing position of the spring vibration isolator 2.

The spring vibration isolators are installed above the intermediate mass block and the rubber vibration isolators are installed below the intermediate mass block. The intermediate balance weight blocks are installed between the spring vibration isolators and the rubber vibration isolators, and the spring vibration isolators and the rubber vibration isolators are uniformly distributed around the intermediate mass block.

It should be noted that, FIG. 2 is a side view of the combined-type vibration isolation device, thus only two spring vibration isolators and two rubber vibration isolators are shown, and it can be understood that, there may be multiple spring vibration isolators and multiple rubber vibration isolators.

For example, four spring vibration isolators and four rubber vibration isolators may be provided.

The determining a combined-type vibration isolation device as required based on parameters of the mechanical device to be isolated in step S1 may include the following steps.

Step S17 may include determining a size of a base plate of the combined-type vibration isolation device based on a size of a bottom of the mechanical device to be isolated.

Step S18 may include determining a mass of the intermediate mass block and a distribution manner thereof based on a mass of the mechanical device to be isolated.

The step S4 may further include the following steps.

Step S41 may include adjusting a rigidity parameter and a damping parameter of each of a spring vibration isolator and a rubber vibration isolator of the combined-type vibration isolation device.

A frequency may be changed by adjusting the rigidity parameter.

By adjusting the damping parameter, the frequency will not be changed, however, the vibration performance may be improved, for example, the resonant response may be significantly damped.

Step S42 may include determining a number of the spring vibration isolator and a number of the rubber vibration isolator of the combined-type vibration isolation device.

Each of the spring vibration isolators and the rubber vibration isolators has a corresponding rigidity, and the number of the spring vibration isolators and the number of the rubber vibration isolators may determine a rigidity of the vibration isolation device, thereby adjusting the inherent frequency of the vibration isolation device.

The mechanical device to be isolated may be connected to a bridge frame, a cable and a pipeline in flexible connection.

A size of a bottom plate of the combined-type vibration isolation device is determined based on a size of the bottom of the mechanical device to be isolated. Generally, a basic thickness of the bottom plate ranges from 20 cm to 30 cm.

According to the definition of a vibration isolation coefficient TA, $$T_A = \frac{\text{a dynamic load transferred to a rigid base after the vibration isolation is performed}}{\text{a dynamic load transferred to a rigid base without performing the vibration isolation}}.$$

Frequencies of 50 Hz, 100 Hz, 150 Hz, 200 Hz, 250 Hz, 300 Hz, 350 Hz and 400 Hz are employed in a test, a simple harmonic load with a constant voltage amplitude of 3 v outputted by an electromagnetism vibration exciter and a power amplifier is applied at a top of a model, to simulate the vertical vibration generated by the magnetostriction in an iron core of a transformer. Acceleration sensors are, respectively, installed at a bottom of a mass block of a simulating transformer, a top of an intermediate mass block, and a base plate, to test the dynamic responses.

Figure 3:
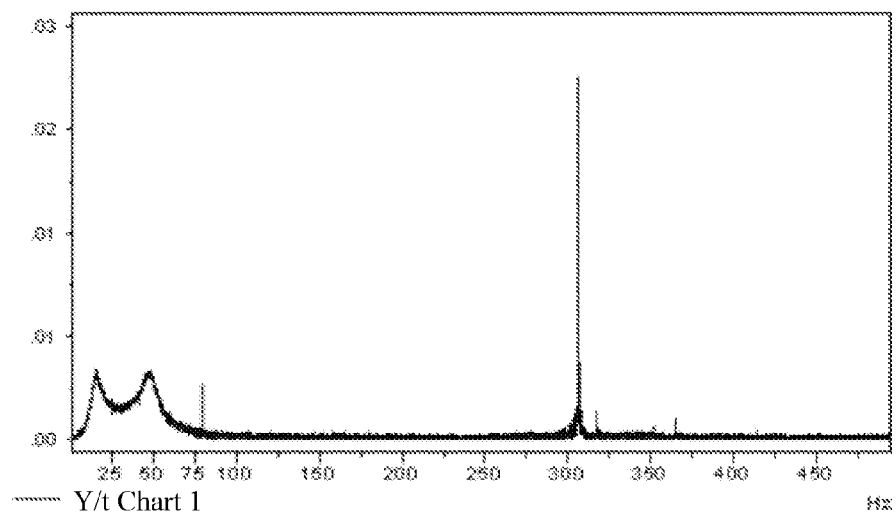
FIG. 3 shows a test result of an inherent frequency according to a preferred embodiment of the present application.
Figure 4:
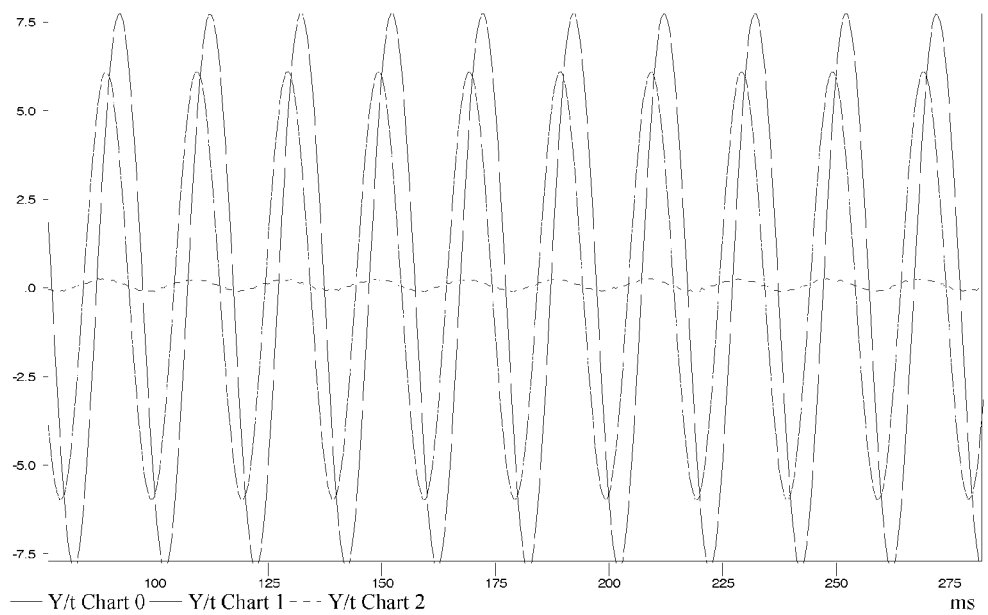
FIG. 4 is a view showing a damping effect in a case that the frequency is 50 Hz according to a preferred embodiment of the present application.
Figure 5:
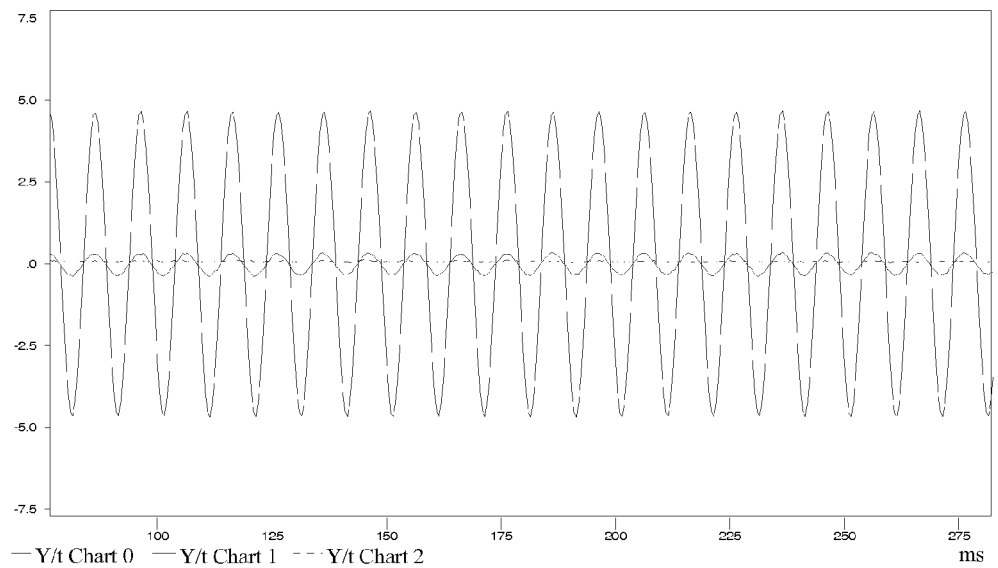
FIG. 5 is a view showing a damping effect in a case that the frequency is 100 Hz according to a preferred embodiment of the present application.
Figure 6:
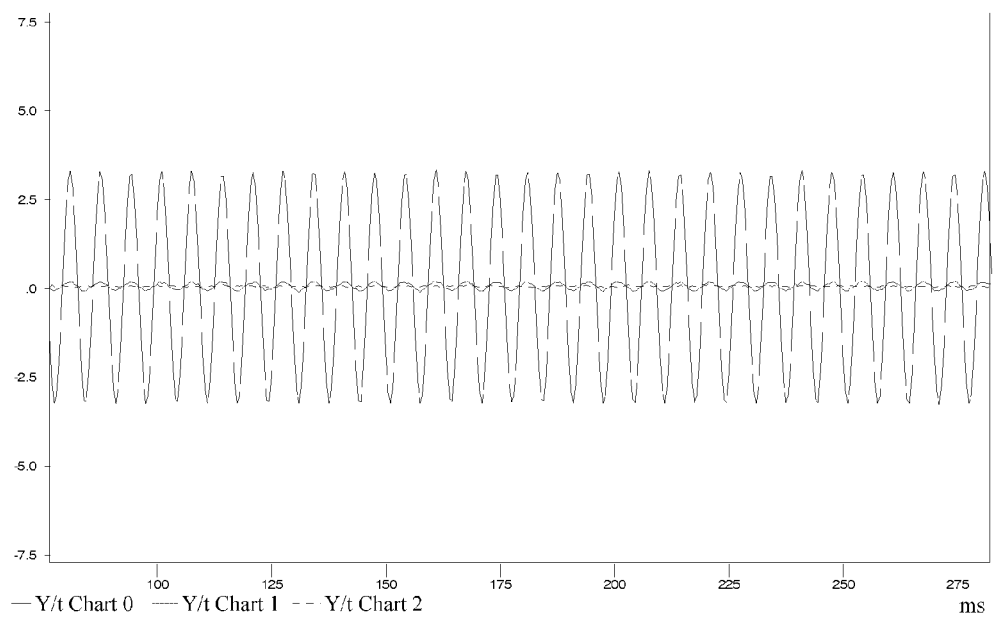
FIG. 6 is a view showing a damping effect in a case that the frequency is 150 Hz according to a preferred embodiment of the present application.
Figure 7:
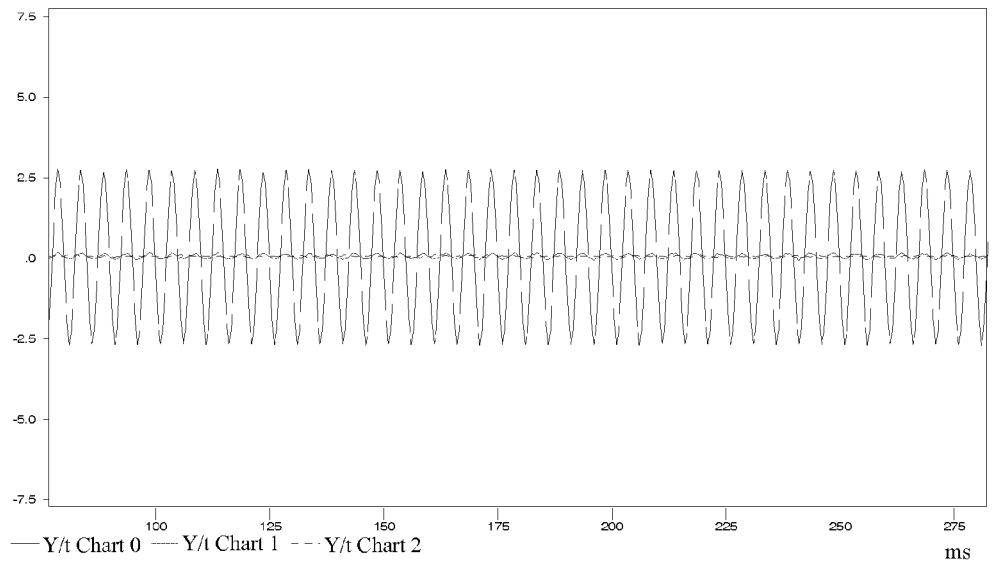
FIG. 7 is a view showing a damping effect in a case that the frequency is 200 Hz according to a preferred embodiment of the present application.
Figure 8:
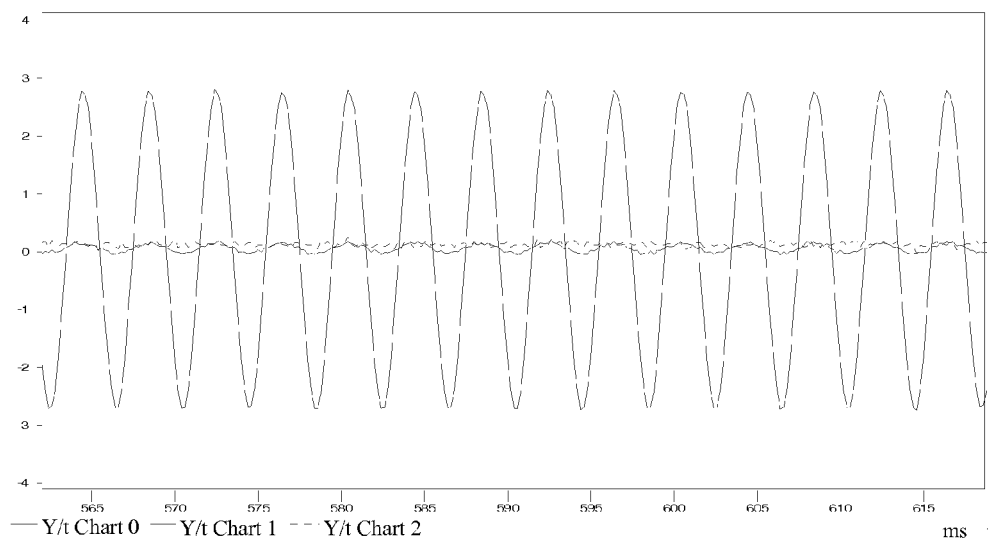
FIG. 8 is a view showing a damping effect in a case that the frequency is 250 Hz according to a preferred embodiment of the present application.
Figure 9:
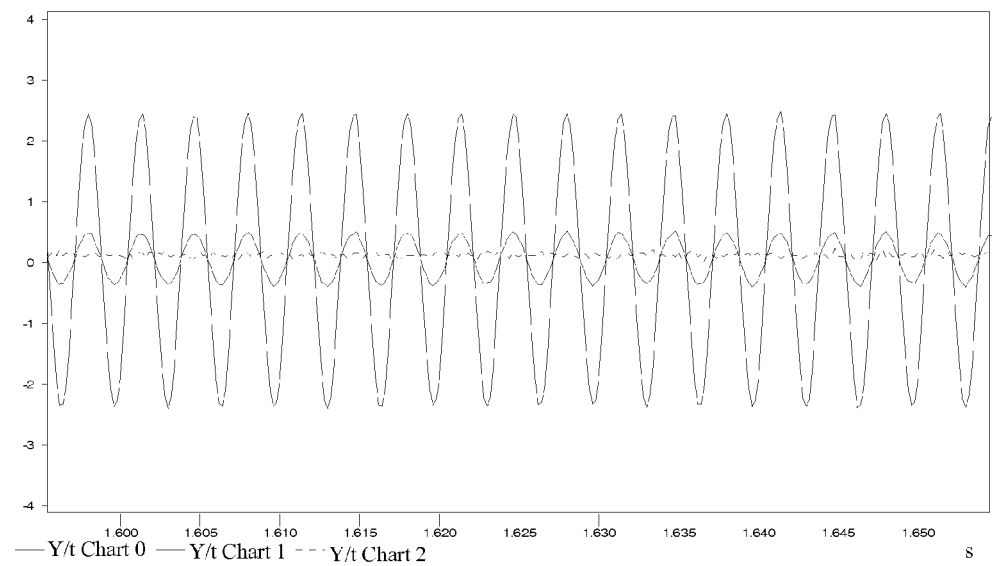
FIG. 9 is a view showing a damping effect in a case that the frequency is 300 Hz according to a preferred embodiment of the present application.
Figure 10:
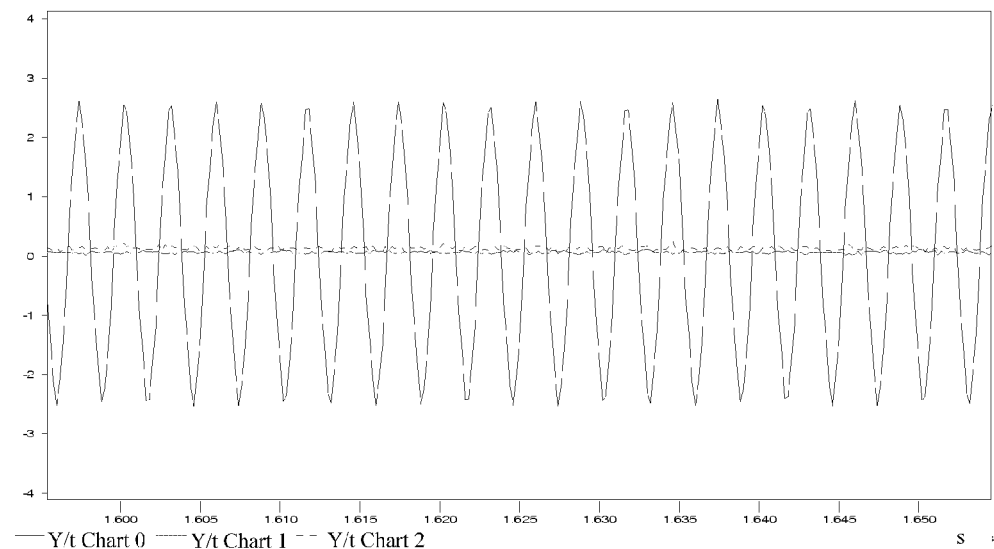
FIG. 10 is a view showing a damping effect in a case that the frequency is 350 Hz according to a preferred embodiment of the present application.
Figure 11:
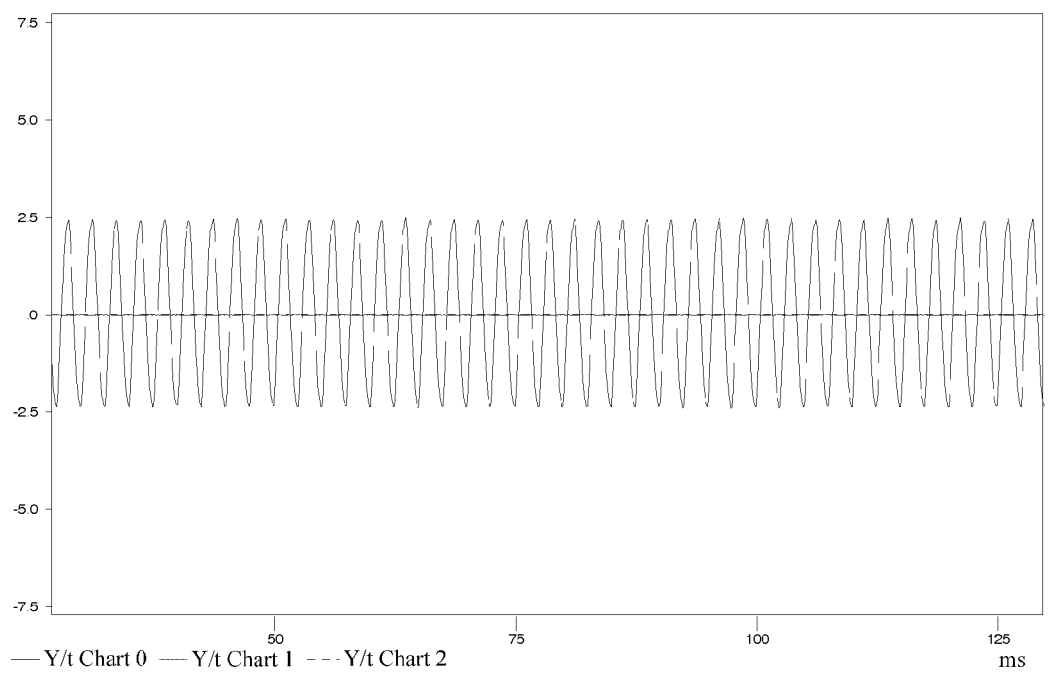
FIG. 11 is a view showing a damping effect in a case that the frequency is 400 Hz according to a preferred embodiment of the present application.

As shown in the Figures, FIG. 3 shows a test result of an inherent frequency according to a preferred embodiment of the present application; FIG. 4 is a view showing a damping effect in a case that the frequency is 50 Hz according to a preferred embodiment of the present application; FIG. 5 is a view showing a damping effect in a case that the frequency is 100 Hz according to a preferred embodiment of the present application; FIG. 6 is a view showing a damping effect in a case that the frequency is 150 Hz according to a preferred embodiment of the present application; FIG. 7 is a view showing a damping effect in a case that the frequency is 200 Hz according to a preferred embodiment of the present application; FIG. 8 is a view showing a damping effect in a case that the frequency is 250 Hz according to a preferred embodiment of the present application; FIG. 9 is a view showing a damping effect in a case that the frequency is 300 Hz according to a preferred embodiment of the present application; FIG. 10 is a view showing a damping effect in a case that the frequency is 350 Hz according to a preferred embodiment of the present application; and FIG. 11 is a view showing a damping effect in a case that the frequency is 400 Hz according to a preferred embodiment of the present application.

It should be noted that, there are three curves in each of FIGS. 4 to 11, one curve is the solid line with the greatest amplitude (which indicates an acceleration response of the intermediate mass block), one curve is the solid line with an intermediate amplitude (i.e. smaller amplitude), and one curve is the dotted line with the smallest amplitude.

The solid line with the greatest amplitude shows the effect when an external excitation force is applied on a top plate of the vibration isolation device, the solid line with the intermediate (smaller) amplitude shows the vibration effect of the intermediate mass block, and the dotted line with the smallest amplitude shows the vibration effect of a bottom plate of the vibration isolation device. Therefore, the vibration response of a large external excitation vibration has been significantly reduced by the vibration isolation device, which illustrates that the vibration isolation effect of the vibration isolation device is excellent.

The dotted line shows the acceleration response of the base plate, and as shown in the Figures, the spring vibration isolators absorb most of the vibration, the remained energy of the vibration is transformed into the vibration of the intermediate mass block, and due to the rubber vibration isolators, only very little vibration is transmitted to the base plate.

According to the analysis of the test data, a vibration attenuation rule of the vibration isolation device, under specific acceleration external loads with different frequencies, is shown as follow.

In the case that the frequency of the external load is between 50 Hz and 300 Hz, the vibration transmission is relatively obvious, which is caused by partial resonance generated since the frequency of 50 Hz is close to a second-order inherent frequency of the vibration isolator (which is 47.6 HZ) and the frequency of 300 Hz is close to a natural vibration frequency of the steel spring (which is 310 Hz). However, a vibration transmission rate may be ensured to be smaller than 1% in other frequency ranges.

According to a field measurement, the vibration noise of the transformer is frequency multiplication of 100 Hz, which mainly includes 100 Hz and 200 Hz. The vibration isolation rate of the device for these two frequencies are, respectively, 0.64% and 1.09%, which demonstrates that the device has a significant vibration isolation effect and may meet the design requirement.

The embodiments described hereinabove are only preferred embodiments of the present application, and are not intended to limit the scope of the present application in any form. Although the present application is disclosed by the above preferred embodiments, the preferred embodiments should not be interpreted as a limitation to the present application. For the person skilled in the art, many variations, modifications or equivalent replacements may be made to the technical solutions of the present application by using the methods and technical contents disclosed hereinabove, without departing from the scope of the technical solutions of the present application. Therefore, any simple modifications, equivalent replacements and modifications, made to the above embodiments based on the technical essences of the present application without departing from the technical solutions of the present application, are deemed to fall into the scope of the technical solution of the present application.

What is claimed is:

1. A method for controlling structure-borne noise based on a combined-type vibration isolation device, comprising the following steps:
    S1: determining a combined-type vibration isolation device as required according to parameters of a mechanical device to be isolated, and installing the combined-type vibration isolation device on a horizontal bearing surface;
    S2: vertically placing the mechanical device to be isolated on the combined-type vibration isolation device;
    S3: adjusting a mass of an intermediate balance weight block of the combined-type vibration isolation device; and
    S4: adjusting an inherent frequency of the combined-type vibration isolation device to be lower than a structural vibration sound transmission frequency generated in the operation of the mechanical device to be isolated.

2. The method for controlling structure-borne noise based on a combined-type vibration isolation device according to claim 1, wherein the installing the combined-type vibration isolation device on a horizontal bearing surface in the step S1 comprises the following steps:
    S11: installing a bottom-layer rubber and a base plate on the horizontal bearing surface;
    S12: installing a rubber vibration isolator on the base plate;
    S13: installing an intermediate mass block on the rubber vibration isolator;
    S14: installing a spring vibration isolator and a damper on the intermediate mass block;
    S15: installing a supporting plate and a top-layer rubber on the spring vibration isolator and the damper; and
    S16: installing the mechanical device to be isolated on the top-layer rubber.

3. The method for controlling structure-borne noise based on a combined-type vibration isolation device according to claim 1, wherein the vertically placing the mechanical device to be isolated on the combined-type vibration isolation device in the step S2 is performed in a manner that a center of gravity of the mechanical device to be isolated coincides with a center of gravity of the combined-type vibration isolation device.

4. The method for controlling structure-borne noise based on a combined-type vibration isolation device according to claim 1, wherein the determining a combined-type vibration isolation device as required according to parameters of a mechanical device to be isolated in the step S1 comprises the following steps:
    S17: determining a size of a base plate of the combined-type vibration isolation device based on a size of a bottom of the mechanical device to be isolated; and
    S18: determining a mass and a distribution manner of an intermediate mass block of the combined-type vibration isolation device based on a mass of the mechanical device to be isolated.

5. The method for controlling structure-borne noise based on a combined-type vibration isolation device according to claim 1, wherein the step S4 further comprises the following steps:
    S41: adjusting a rigidity parameter and a damping parameter of each of a spring vibration isolator, a damper and a rubber vibration isolator of the combined-type vibration isolation device; and
    S42: determining a number of the spring vibration isolator and a number of the rubber vibration isolator of the combined-type vibration isolation device.

6. The method for controlling structure-borne noise based on a combined-type vibration isolation device according to claim 1, wherein an installing position of the rubber vibration isolator is opposite to an installing position of the spring vibration isolator in a vertical direction.

7. The method for controlling structure-borne noise based on a combined-type vibration isolation device according to claim 1, wherein the spring vibration isolator is installed above the intermediate mass block and the rubber vibration isolator is installed below the intermediate mass block.

8. The method for controlling structure-borne noise based on a combined-type vibration isolation device according to claim 1, wherein the intermediate mass block is installed between the spring vibration isolator and the rubber vibration isolator, and the spring vibration isolator and the rubber vibration isolator are uniformly distributed around the intermediate mass block.

* * * * *